Oct. 30, 1934.  H. R. HOWSER, JR  1,979,159
PHOTOGRAPHIC FINDER
Filed March 15, 1934  4 Sheets-Sheet 1

Harry R. Howser Jr. Inventor

By Lee L. Townshend
Attorney

Oct. 30, 1934.  H. R. HOWSER, JR  1,979,159
PHOTOGRAPHIC FINDER
Filed March 15, 1934   4 Sheets-Sheet 2

Harry R. Howser Jr. Inventor

By Lee L. Townshend
Attorney

Oct. 30, 1934.          H. R. HOWSER, JR          1,979,159
                        PHOTOGRAPHIC FINDER
              Filed March 15, 1934      4 Sheets-Sheet 3
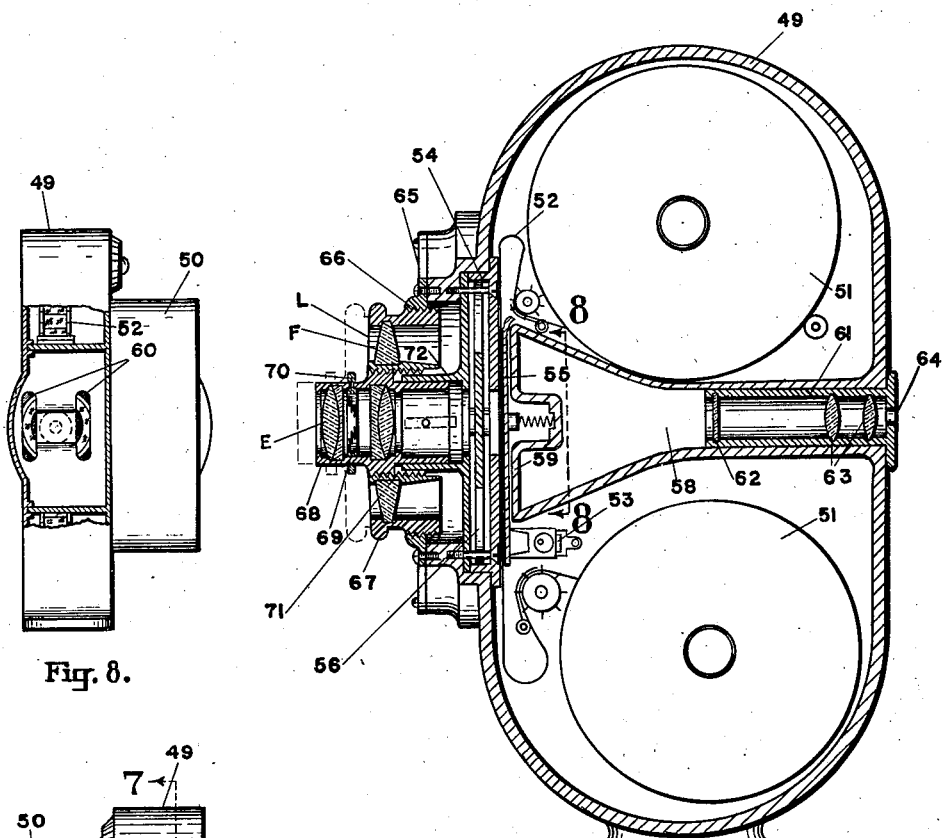
Fig. 8.
Fig. 7.
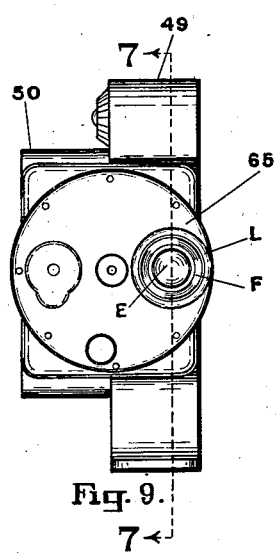
Fig. 9.
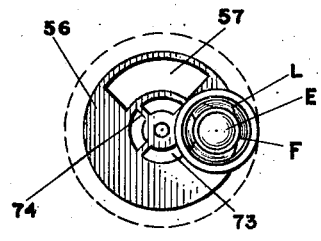
Fig. 10.
Harry R. Howser, Jr.  Inventor
By  Lee L. Townsend
                    Attorney Oct. 30, 1934.  H. R. HOWSER, JR  1,979,159
PHOTOGRAPHIC FINDER
Filed March 15, 1934      4 Sheets-Sheet 4

Harry R. Howser Jr. Inventor

By Lee L. Townshend
Attorney

Patented Oct. 30, 1934

1,979,159

UNITED STATES PATENT OFFICE 1,979,159

PHOTOGRAPHIC FINDER

Harry R. Howser, Jr., Washington, D. C.

Application March 15, 1934, Serial No. 715,736

18 Claims. (Cl. 95—42)

The primary object of this invention is to provide a uniaxial lens system including an exposure portion and a portion used exclusively for finder purposes having a common field of view.

A further object of the invention is to provide a lens system having a portion thereof exclusively used for finding purposes.

Another object of the invention is to provide a uniaxial combined exposure and finder lens system having a common field of view that at all times permits critical focus for finding, irrespective of the light value adjustment for exposure.

A further object of the invention is to provide a reflecting type camera with a lens system that at all times permits critical focus after it has been stopped down for depth of focus.

Still another object of the invention is to provide a uniaxial lens system including an exposure portion and a finder portion having different focal points but a common field of view. The portions may be interconnected for synchronous critical focusing.

Other objects will, from the description, be apparent to those skilled in the art. The present disclosure constitutes an exposition of an embodiment of the invention, and illustrates the best means I have thus far devised for reducing the invention to practice. It is to be understood that the structural details shown and described shall not constitute limitations inconsistent with the scope of the invention as claimed.

In the drawings:

Figure 7 is a partial vertical section of a moving picture camera having my improved lens system applied thereto, taken on the line 7—7 of Figure 9.

Figure 8 is a section on the line 8—8 of Figure 7 with the film reels and feed mechanism not shown.

Figure 9 is a front elevation of the form of moving picture camera shown in Figure 7.

Figure 10 is a plan of the shutter used in this type of camera with the lens superposed thereon diagrammatically.

The advent of the anastigmat lens has made it possible to obtain a sharp image over the entire field of a lens. I subdivide this field into a center portion used primarily for exposure purposes, although in some instances also finder purposes, and an outer portion used exclusively for finder purposes. This forms a uniaxial lens system in which both portions being mounted on a common principal axis have a common field of view, and the same or different focal points as may be desired. The center portion is of a size normally required for the speed desired, and this requires a slightly larger diameter to provide the outer portion used solely for finding purposes. It is a well known principle that the surface areas do not increase in direct proportion to the respective diameters, and correspondingly a slight increase in diameter of the lens will materially increase the capacity. However, in some instances the exposure portion of the lens alone may be corrected and the finder portion may be a conventional lens ordinarily used for finder purposes.

It will be understood that the term "lens system" used in the description of this invention includes a conventional arrangement of ground glass discs preferably mounted and arranged for the desired and well known purpose. The lens as such may be one piece subdivided usually but not necessarily by the barrel portion or casing of the conventional iris type diaphragm, or in two concentric parts having the same principal axis. It is also obvious that as the lens system is used both for finding and exposure purposes, during exposure the light rays used only for finding purposes must be segregated from those used for exposure purposes. In a reflector type camera that uses a single lens for finding and taking this segregation is only at the time of exposure. Applied to a camera normally requiring a separate finder, it is permanent.

I found that blocking off sections of the finder portion of the lens or the finder lens does not materially affect the definition of the image. Means incorporated within the range of vision of these elements for supporting the type of diaphragm used, or for other purposes, do not affect the projected image on the viewing screen other than diminishing the volume of light in proportion to the area blocked. The light value desired can be easily provided.

Figure 1:
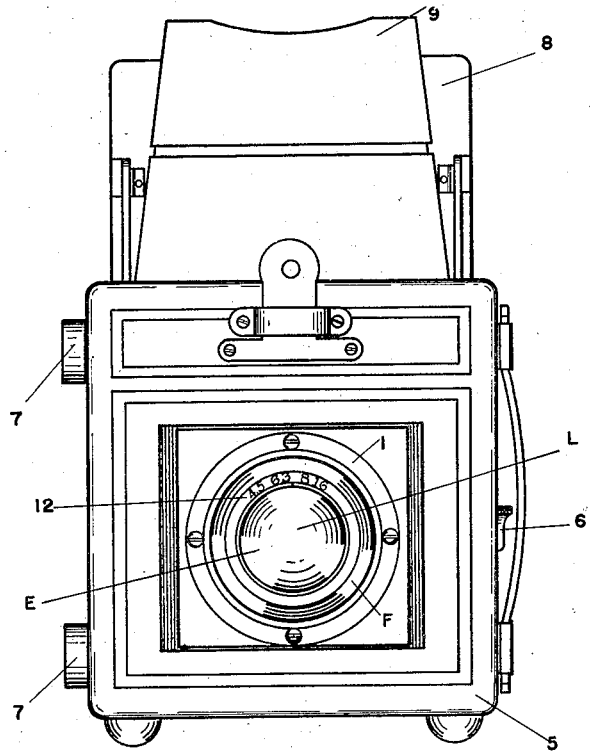
Figure 1 is a front elevation of my improved lens applied to a reflector type camera.
Figure 2:
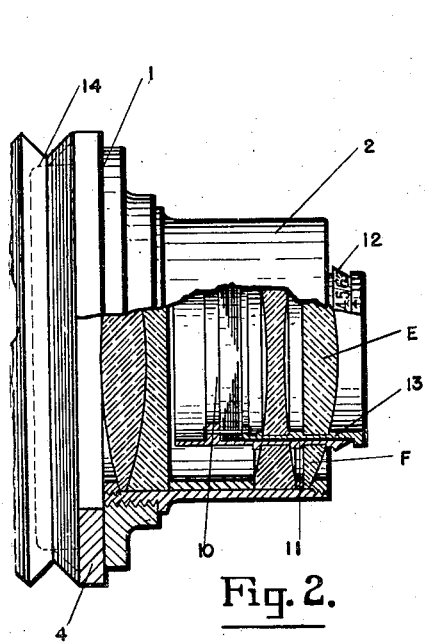
Figure 2 is a partial vertical section through the lens system.
Figure 4:
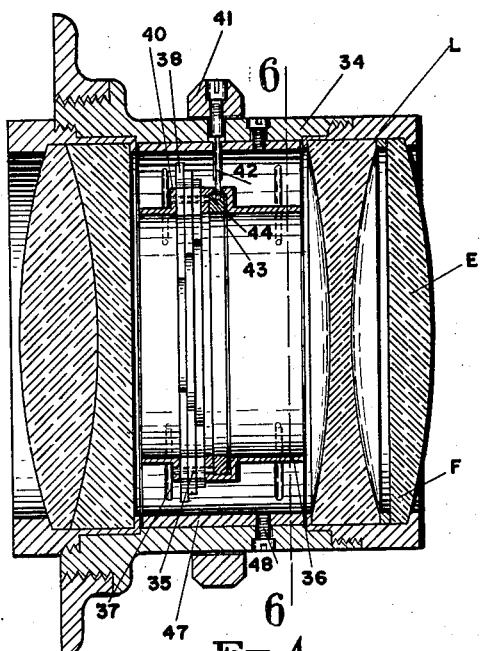
Figure 4 is a vertical section of a lens system illustrating a compensating diaphragm.
Figure 13:
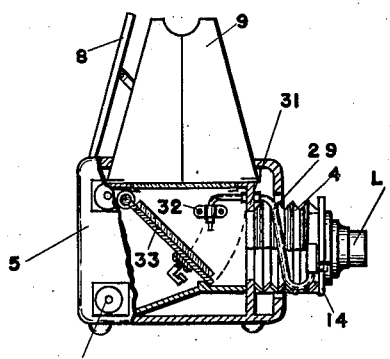
Figure 13 is a partial vertical section showing a reflector type camera to which my lens system is applied.

In Figures 1, 2 and 13 of the drawings there is illustrated the application of my improved lens system to a type of camera normally using a single lens for finding and exposure. The lens L comprises the usual cylindrical support receiving the properly ground glass disc focusing elements usually of the anastigmatic type which are segregated or subdivided by a means to be hereinafter more fully described into a central portion E, through which the exposure is taken, and a circumferential portion F used exclusively for finding purposes. Certain focusing elements may be separate, as shown in Figure 2, or in a single unit, as shown in Figure 4. It is, however, important that the center portion and the outer portion of the lens have the same principal axis and a common field of view. The finder portion therefore surrounds the center or objective portion to form a compact assembly accomplishing this purpose. In the type of camera illustrated in these views the center objective or exposure portion E of the lens system also acts as a finder, but the portion F of the lens system is always exclusively used for finding purposes.

The lens L is mounted on a ring 1 secured to the front face 4 of a bellows carried by the body 5 of the camera. This camera has the usual trip lever 6, shutter knobs 7, cover 8, and observing hood 9.

As shown particularly in Figure 2, the usual iris type diaphragm 10 is mounted in the cylindrical support between certain of the focusing element. For such a mounting the lens elements must be cut, or made in two parts. A barrel 11 is mounted on the inner edge of the outer lens portion F intermediate its ends. The inner end of this barrel supports the diaphragm 10, while its outer end is enlarged and inclined, as shown at 12, to receive indicia thereon.

A supplemental inner diaphragm operating barrel 13 carries the inner or central portion E of the lens system intermediate its ends. The outer end is flanged and provided with a marker cooperating with the indicia on the face 12 of the inner barrel. The inner barrel is rotatable and its inner end is connected with the diaphragm 10. Rotation of the inner barrel will, of course, vary the diaphragm opening in the well known manner.

The diaphragm and lens portion E is a size normally required for the speed desired. The outer portion of the lens F, which is used solely for finding purposes, covers what is in effect a light opening in the face of the camera surrounding the portion used for exposure purposes. In any type of camera the light rays passing through the lens E must be segregated from the light rays passing through the lens F for exposure. In the type camera now described this is only necessary at the time of exposure. For this purpose I have provided a masking means operable at exposure to close off the finder portion. This is shown in Figure 3.

The masking device is mounted in a frame 14 in the front of the bellows 4. The frame carries a plate 15, having a central opening corresponding in diameter to the lens cylinder, and aligning therewith. Upon the plate 15 is mounted a plurality of sector shaped meshing elements 16, provided with extensions 17, carrying studs 18. These sectors are operated through the medium of a ring 19, having a limited rotary movement. This movement is limited by pins 20 in arcuate slots 21, the pins being carried by the plate 15. The ring 19 has a plurality of tangential extensions 22, corresponding in number to the number of sectors 16. Each extension has a slot 23 receiving a stud 18 of its adjacent sector.

The ring is rotated by a modified bell crank lever 24, having a slotted arm 25, engaging a pin 26 on the ring. The lever 24 is fulcrumed in the frame and has its other arm 27 extending away from the ring. On the frame is mounted an expansion spring 28 having one end engaging the lever arm 27, and exerting sufficient tension to hold the ring in the position shown in Figure 3, with the masking sectors in inoperative position. The lever is operated against the tension of the spring 28 by one end of a flexible rod 29, secured by a bracket 30 in the frame. This rod 29 is carried back through a wall 31 of the camera, as shown in Figure 13, and a bracket 32 fastens the other end. This end of the rod is positioned in the path of movement of the usual mirror 33 of this type of camera.

Figure 3:
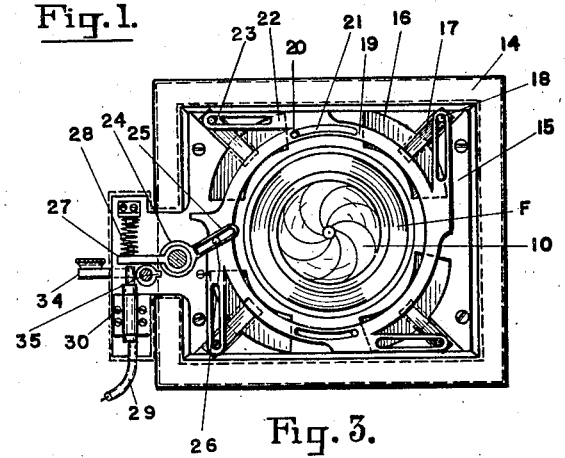
Figure 3 is a plan view of the masking means used in a reflector type camera to cut off the portion of the lens used for finding purposes exclusively at the time of exposure.

As shown in Figure 3, the masking sectors 16 are withdrawn from the lens path and the diaphragm 10 is stopped down fully. In this position such a limited amount of light passes through the lens E and restricted diaphragm opening that alone it would be insufficient to project a clearly defined image by the mirror 33. However, the finder lens portion F is unobstructed by the diaphragm and sufficient light passes therethrough to reflect a brilliant image on the mirror for critical focusing. As soon as the trigger 6 is operated, the mirror 33 is released. At the limit of its movement it has engaged the inner end of the rod 29. An operating movement is then transmitted to the bell crank lever 24, and the ring 19 partially rotated. The illustrated engagement between the tangential ring extensions 22 and the sectors 16 will move these sectors inwardly until their ends meet, and combined they form an annular mask for the finder lens portion F. As this occurs just preceding operation of the usual shutter, the finder light rays are segregated from the exposure light rays so as not to destroy the proper light value set on the diaphragm. Upon release of the mirror the spring 28 returns the parts to normal position. A thumb lever 34 is fulcrumed in the frame and carries a projection 35, engageable with the under side of the arm 27, to manually actuate the masking means when desired. This permits cutting off the finder portion without operating the shutter for observing the depth of focus.

Figure 6:
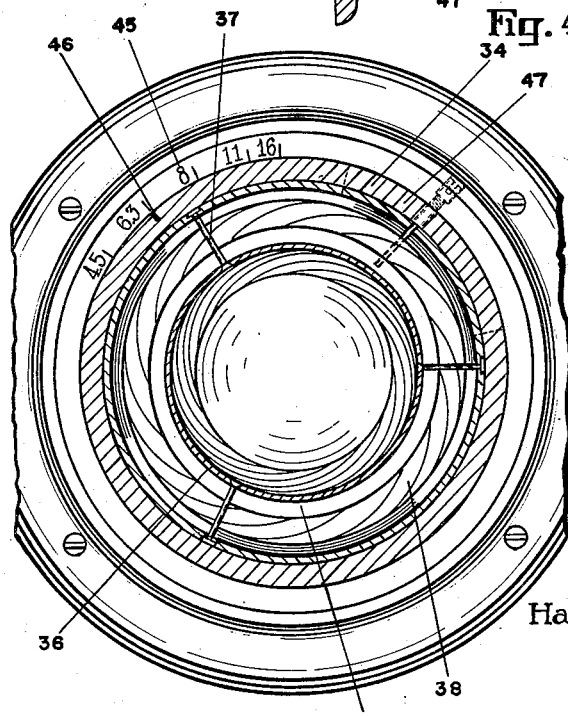
Figure 6 is a section taken on the line 6—6 of Figure 1.
Figure 5:
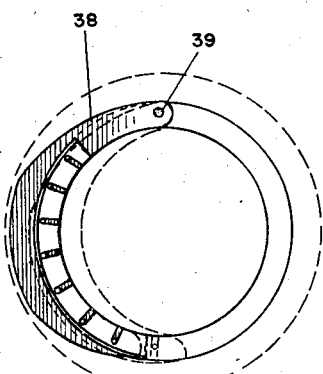
Figure 5 is a fragmentary plan view of one of the leaves of the diaphragm illustrated in Figure 4 partly broken away.

In Figures 4, 5 and 6 is illustrated a modification in which a uniform light value passes through the lens system for finding purposes up to the time of exposure irrespective of the diaphragm setting. The lens L has a cylinder 34, which has mounted therein the usual front lens and the spaced rear lens, functioning as understood. The cylinder is adapted to be secured to a camera front. A modified iris type diaphragm 35 is mounted on a supporting barrel 36, held in spaced relation to the interior of the cylinder by radial rods 37. The barrel subdivides the lens into the central portion E and the outer portion F for the same purpose heretofore described. The leaves 38 of the diaphragm are pivoted at 39, and are arranged in overlapping relation as is conventional. However, the leaves are enlarged and extending in the light path of the lens system at the inner and outer sides of the barrel 36. The pivots 39 are secured in outstruck portions 40 of the barrel.

The diaphragm 35 is operated by an annular rotatable ring 41, mounted on the cylinder 34, and having an inwardly extending portion 42 connected to an inner ring 43, housed in an enlargement 44 of the outer extension 40 of the diaphragm barrel 36. The cylinder and barrel are arcuately slotted to allow a limited movement of these parts. The ring 41 has on its front face indicia 45 adapted to cooperate with a stationary marker 46 on the cylinder. The diaphragm assembly is mounted on an inner sleeve 47, carrying the rods 37, and is rigidly secured to the cylinder by set screws 48.

It is obvious that this construction maintains a constant light value passing through the lens system. Variations of the diaphragm opening for the central portion of the lens E are compensated in the outer portion F. As the central diaphragm opening is made smaller or larger, the light opening surrounding the barrel 36 is correspondingly increased or decreased. This compensating means always maintains a constant light value for critical focusing irrespective of the diaphragm setting by movement of the ring 41. The supporting rods 37 are invisible on the projected image. Of course, upon exposure the masking means previously described mask the outer finder portion F of the lens and the exposure is made through the properly set diaphragm opening.

As I have found that, in utilizing the outer portion of a lens system exclusively for finding purposes, blocking of an appreciable portion does not affect its use, the generic principle of this invention is applicable to other types of camera than that previously described. Figures 7, 8, 9 and 10 show the application to a moving picture camera.

The usual camera is provided with a film portion 49 and an offset housing 50 containing the operating mechanism. Winding and feed reels 51 carry the film strip 52 in the usual manner. A conventional feed mechanism is shown at 53. The film is guided across the light path behind a part of the shutter housing 54, by the usual guide slide 55. This light is at one side of the axis of the driven shutter 56, which is provided with the usual exposure opening 57.

Within the portion 49, of the camera, is a light box or segregator 58, positioned between the reels 51, and having a front face 59 backing the guide slide 55. The front face 59 is provided with a pair of spaced vertical slots 60 that are spaced apart a slightly greater width than the width of the film 52. The light box 58 terminates rearwardly in an opening in the rear wall of the camera portion 49, and has positioned therein a tubular sleeve 61, carrying a screen 62 and inverting lens 63. A slight opening 64 is provided at the rear end of the tubular sleeve 61.

The front face of the camera has a face plate 65 of the same size as the corresponding portion of the shutter housing. This plate has an interiorly threaded opening 66 in which is mounted the lens system L. The lens system is subdivided or segregated into a central objective or exposure portion E and an outer finder portion F. The outer finder portion is mounted in an annular spaced two-part casing 67 externally threaded for engagement with the face plate opening 66. The optical element illustrated is a simple form of lens, but anastigmatic compound lens may be used if desired. The inner portion of the casing 67 is internally threaded. Mounted through the same is the objective or exposure portion of the lens E, which comprises a casing 68, carrying therein the usual ground glass elements and also a diaphragm 69, operated by an annular ring 70. Intermediate its ends the casing is externally threaded at 71 for engagement with the internal threads on the support 67. This arrangement supports the inner and outer portions of the lens system L, on a common principal axis. The shutter housing 54 has a forwardly extending tubular extension 72, surrounding the barrel of the lens E. The rear portion of the casing 68 slidably engages this extension and has a pin and slot connection therewith for a purpose to be hereinafter described.

As illustrated in Figure 9, the lens system L is at one side of the axis of the shutter. This relationship is diagrammatically shown in Figure 10. Surrounding its axis and spaced inwardly from the film exposure opening 57 in the shutter is a series of openings 73; spider arms 74 connecting the inner and outer portions of the shutter. The shutter normally closes the objective or exposure center portion E, except at periods of exposure, but peripherially leaves a section of the finder portion F permanently open at one side, and the openings 74 leave a section substantially permanently open at the other. These sections are in alignment with the vertical slots 60 of the light box 58.

By the arrangement above noted the lens system L is adapted to be applied to a motion picture camera. The light rays used for finding purposes passing through the uninterrupted portions of the lens portion F are permanently segregated from the exposure rays passing through the lens portion E. Light rays pass through the outer casing 67 and optical element therein in sufficient quantities for finding and focusing purposes. They pass through the slots 60 into the light box 58 where the elements in the sleeve 61 will display the image when observed through the sight opening 64. With appropriately ground lens portions E and F, having a common principal axis, the image will be observed on a common field of view with the exposure portion.

Due to the fact the lens portion E and the lens portion F have different focal points when applied to this type of camera, I have provided means whereby the focusing of one portion automatically focuses the other. The outer portion of the lens support 67 has a threaded engagement with the face plate opening 66, and is adapted to be moved in and out of the same. Due to the fact the supporting casings 67 and 68 have a threaded coupling 71, movement is transmitted to the inner portion of the lens. This movement, due to the pin and slot connection between the shutter housing extension 72 and the inner end of 68, is a sliding one. The threaded coupling 71 has threads of a different pitch. The variance in the movement controlled by difference in pitch of the threads automatically focuses the outer and inner portions of the lens. Thus it will be seen that adjustment of the finder portion F by moving the casing 67 in or out of the face plate will automatically adjust the objective or exposure inner portion E. Various other mechanisms may be employed to accomplish this result, the form described being merely illustrative.

Figure 11:
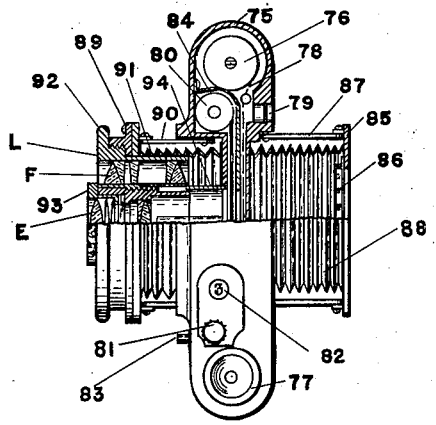
Figure 11 is a partial vertical section of a folding type camera showing my improved lens system applied thereto.
Figure 12:
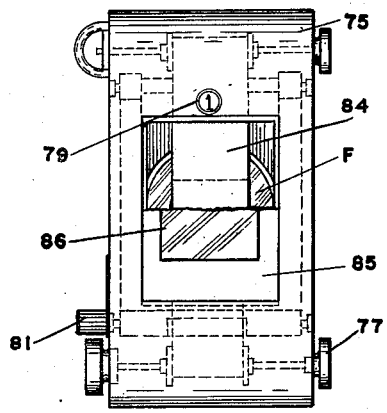
Figure 12 is a rear elevation of the type of camera shown in Figure 11 with the ground glass back plate partly broken away to show portions of the lens used for finding purposes.

In Figures 11 and 12 I have shown the application of this type of lens system to another camera of a conventional type. The camera body 75 carries the usual spools 76, operated by knobs 77, over which the film strip 78 is wound. A sight opening 79 permits identification of the exposures. A conventional focal plane shutter 80 is arranged therein having the usual tension adjusting knob 81 and tension indicator 82. A trigger 83 operates the shutter. A light-proof film cover 84 is positioned in the camera body and encloses the film strip except at the exposure opening point. The camera shown is of the folding type and has an extensible rear wall 85, carrying a screen 86, and hingedly connected at 87 to the camera body. A bellows 88 is arranged between the extensible wall and body.

The lens system L comprises the exposure portion E and finder portion F. The lens system is threadedly mounted for adjustment in and out of a front plate 89 hingedly connected at 90 to the camera body. The usual bellows 91 is provided. The lens system is substantially of the type described in Figure 7, and comprises an outer lens portion support 92 hingedly coupled by variably pitched threads to the inner lens support 93. The inner camera face has a tubular extension 94 cooperatively engaging the inner end of the support 93 to prevent rotation thereof but to permit a sliding movement.

With the camera arranged as shown in Figure 11, the light rays passing through the portions of the lens F of the system that are not interrupted by the film cover 84 are projected on the view screen 86. This projects an image having a common field of view to the exposure portion E of the lens system. As diagrammatically shown, the image is projected inverted, but this may be corrected by conventional means, not shown. Due to the fact that the portions E and F of the lens system have different focal points, the variable pitch coupling between the tubular supports 92 and 93 permit automatic adjustment upon adjustment of the support 92 for the finder portion F in the face plate of the camera.

Figure 15:
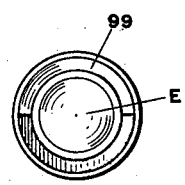
Figure 15 is a front elevation of the reflecting mirror mounted as used in the type of camera illustrated in Figure 14.
Figure 14:
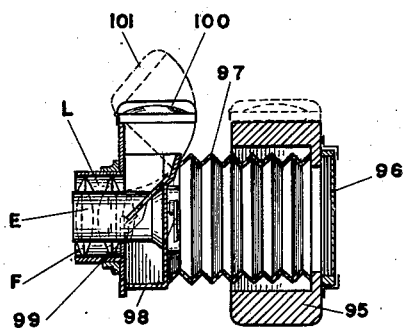
Figure 14 is a vertical section partly in elevation of a conventional form of folding camera showing another form of applying my lens system thereto.

In Figure 14 I have diagrammatically illustrated another adaptation of this type of lens system to a folding type camera. The camera 95 has the usual plate container 96, front bellows 97, and shutter trip 98. The lens system L secured to the front thereof includes the outer finder lens portion F and inner exposure portion E. Mounted upon the casing supporting the portion E is a fixed inclined semi-circular mirror 99 adapted to reflect an image on the screen 100. A light shade 101 is hingedly mounted on a portion of the lens system and cooperates with the screen L. The portion of the lens F that cooperates with the mirror 99 is shown diagrammatically at Figure 15.

With this construction the upper half of the light rays passing through the portion F of the lens system are reflected upwardly to the viewing screen 100 to project the common image viewed thereon. The remaining rays are not used. This arrangement permits a finder screen to be immovably directly connected to the lens system, and all of the advantages derived from the system previously described are present therein.

The various disclosures noted permit the use in all types of cameras of a photographic uniaxial lens system having a common field of view adapted for finding purposes and not affected by light value variations due to diaphragm adjustments. In the reflector type camera this was heretofore impossible because the diaphragm adjustment for depth of focus destroyed critical focus on the single lens used. In cameras using a separate finder parallax variation between the exposure lens and the finder lens prevented a common field of view.

I claim:

1. A photographic lens system having a portion thereof exclusively used for finding purposes, and means for varying the effective area of the remaining portion while the area of the finder portion remains constant.

2. In combination with a camera, a subdivided combined objective and finding lens, a variable diaphragm controlling a portion of the lens, and means for masking the remaining portion of the lens during exposure.

3. In combination with a camera, a subdivided combined objective and finding lens, a variable compensating diaphragm maintaining a constant light value passing through the lens at any variation, and means for masking the portion of the lens used solely for finding only during exposure.

4. A combined objective and finding lens system having a diaphragm, a means whereby the amount of light passing through the lens system for sighting or finding purposes is constant irrespective of the diaphragm opening.

5. The combination with a reflecting type camera having a mirror, a lens system including an adjustable diaphragm and having a portion of the lens exclusively used for finding purposes surrounding the diaphragm, and means for masking the exclusive finder portion of the lens upon movement of the mirror.

6. In combination a camera, a uniaxial lens system having a portion thereof exclusively used for finding purposes, and means for segregating the image projected by said portion from the image projected by the remainder of the lens for exposure.

7. In combination a camera, an objective lens having a light opening peripheral to the same, and a finder lens uniaxial with the objective lens arranged in said opening.

8. In combination a camera, a subdivided uniaxial lens system for projecting an image on a light sensitive substance and an image on a screen for finding purposes, and means for segregating said images for exposure.

9. In combination a camera, a uniaxial lens system having portions for projecting multiple images, a portion of said lens projecting an image used solely for finding purposes, and means for segregating said image from the remainder for exposure.

10. In combination a camera, a photographic lens system including an objective portion and a finder portion having the same principal axis, and means for segregating the image projected by the objective portion for exposure.

11. In combination a camera, a photographic lens system including an exposure lens and a peripherally mounted finder lens, and means for segregating the image projected by the exposure lens for exposure.

12. A combined photographic and finding lens system having means for maintaining a light value sufficient to project a brilliant image for finding purposes when the lens portion is stopped down for depth of focus.

13. In combination a camera, a photographic lens system including an objective lens and a finder lens having the same principal axis, means for segregating the images projected by said lenses for exposure, and means for sighting through any portion of the finder lens during exposure through the objective lens.

14. In combination a camera, a uniaxial lens system including an exposure portion and a portion used solely for finding purposes having a common field of view, and means for segregating the image projected by the exposure portion for exposure.

15. In combination a camera, a uniaxial photographic lens system having means therein for dividing the light rays passing therethrough into a finding group and an exposure group, and means for segregating said groups so that the projected images will be separated for exposure.

16. In combination a camera, a lens system including a finder lens portion and an objective lens portion mounted on the same principal axis, said lens portions having different focal lengths, and means for segregating the images projected by each of said portions.

17. In combination a camera, a uniaxial photographic lens system including a finder lens and an exposure lens having a common field of view, and means for temporarily segregating the separate images projected by said system during exposure.

18. In combination a camera, a uniaxial lens system for projecting separate images, and means for permanently segregating said images so one may be used for finding and the other for exposure.

HARRY R. HOWSER, Jr.